A. E. KRAUSE.
FILTERING MATERIAL.
APPLICATION FILED NOV. 27, 1912.
1,056,800.
Patented Mar. 25, 1913.
Fig. 1,
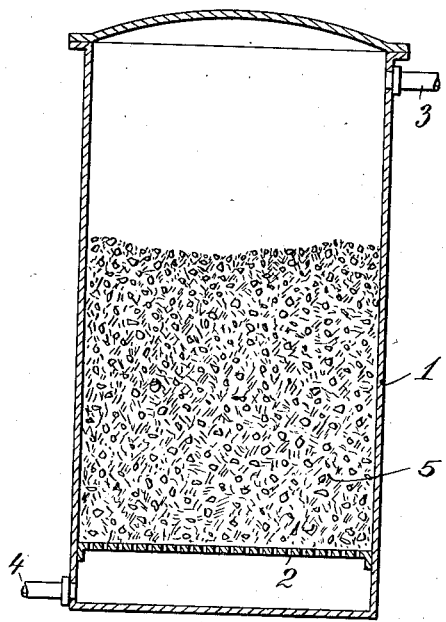
Fig. 2,
Witnesses:
Max B. J. Doring
Paul H. Franke
Inventor
Arthur E. Krause
By his Attorneys

UNITED STATES PATENT OFFICE.

ARTHUR E. KRAUSE, OF JERSEY CITY, NEW JERSEY.

FILTERING MATERIAL.

1,056,800.

Specification of Letters Patent. Patented Mar. 25, 1913.

Application filed November 27, 1912. Serial No. 733,729.

*To all whom it may concern:*

Be it known that I, ARTHUR E. KRAUSE, a citizen of the United States of America, and a resident of Jersey City, in the county of Hudson and State of New Jersey, have invented certain new and useful Improvements in Filtering Material, of which the following is a specification.

My invention relates to an improved filtering material, particularly adapted for use in the process of separating oil and grease from water, described in U. S. Letters Patent Nos. 705,253 and 729,775; but my improved filtering material is also applicable to filtration of other liquids than water carrying oil or grease.

The improved filtering material herein described comprises a mechanical mixture of fibrous mineral material and combustible granular material.

Heretofore a filtering material composed of fibrous material and non-combustible granular material has been proposed; the primary function of the granular material in such filtering material being to avoid undue compression of the fibrous material, and the consequent early clogging of the filtering material. Owing to the compressible nature of fibrous material when used in bulk in an ordinary filter, the usefulness of the material is soon limited by reason of the entire bulk thereof becoming so tightly packed or compressed that the amount of liquid which can be forced through or made to pass in a given time, soon becomes too limited for further use of the filter, so that the process must soon be interrupted in order to stir up and loosen the material so as to permit the liquid to flow through with more freedom. If a hard or relatively incompressible granular material be mixed in suitable proportions with the fibrous material, the entire bulk of the fibrous filtering material retains its form, and cannot be compressed as it would be if the fibrous material alone were used, the reason being, presumably, that all the compressive force exerted by reason of the pressure at which the fluid to be filtered is supplied, is taken up by the grains of incompressible material, thus protecting the fibrous material within the interstices of the incompressible material from detrimental pressure tending to pack the fibers together, the result being that the flow of liquid between the particles of fibrous material is made very much easier, the filter can be operated a much longer time before it becomes so clogged as to require cleaning, and the contact of the liquid with the fibrous material is rendered all the greater and more efficient. In former mixtures of fibrous filtering material and granular material, the granular material has been of an incombustible nature. Such filtering material, when finally clogged or, as is said in the art, "exhausted", cannot be utilized or disposed of to advantage, but must be carried away at considerable expense; and if clogged with oil or grease of a decomposable nature, or with other objectionable materials, may become a considerable nuisance.

According to my present invention the granular substantially incompressible material employed is a combustible material, such as charcoal, coke, coal screenings, sawdust, etc. A filtering material comprising a mixture of such granular combustible material and fibrous material, when exhausted, may be charged into a furnace (for example, the furnace of a steam boiler) and there burned. Particularly if the filtering material has been used for filtering oil or grease out of water, or other liquid, the exhausted filtering material, when so charged into a furnace, burns freely. Of course the incombustible constituents, if any, of such filtering material, do not burn; but the combustible constituents do burn, as well as the combustible material (oil, grease, etc.) with which the filtering material may be charged.

The object of my invention is to produce a filtering material that may be utilized economically as a useful waste product after the said material has become exhausted, thus reducing to a minimum the cost of disposal of the exhausted filtering material, and even rendering it valuable as a fuel.

I will now proceed to describe my invention with reference to the accompanying drawing, in which a filter containing a body of filtering material such as hereinbefore referred to is illustrated more or less diagrammatically.

In the said drawing: Figure 1 shows a central vertical section of the filter and Fig. 2 is a diagrammatic view illustrating on an enlarged scale the mixture of combustible granular material and fibrous material employed as a filtering material.

In the said drawings, 1 designates a container for the filtering material, having a screen false bottom 2, and having an entrance connection 3 and a discharge connection 4.

5 designates the filtering material, the same comprising a mechanical mixture of fibrous material, designated in Fig. 2 by the numeral 6, and a granular combustible material, designated in Fig. 2 by the numeral 7.

When the filtering material is to be employed for the extraction of oil and grease, the fibrous, elastic or compressible absorbent filtering material 6 is, preferably, asbestos, fibrous serpentine, or the comminuted serpentine rock from which the asbestos is mined. The combustible granular incompressible material is preferably charcoal, coke, coal screenings, or sawdust, though other granular combustible materials may be employed. The filtering mixture (supposing the fibrous material to be fibrous serpentine and the combustible material to be coke) may contain said ingredients in the proportion of one part by weight of fibrous serpentine to two parts of combustible material; the coke being preferably of such size as will pass through screens of from ten to sixty meshes to the inch; although I do not limit myself to any particular size of granular combustible material. The proportions of the two ingredients may also be varied widely without departing from my invention.

The mixture of asbestic or serpentine material and granular combustible material, besides being useful for the extraction of oil or grease, is also applicable for the separation of various other substances. The improved filtering material herein described may also be used for the extraction of oil or grease from steam or air. I do not limit myself to the use of my filtering material for filtering any particular substance, or to the use of any particular form of filtering apparatus, or to any particular method of disposing of the filtering material when exhausted.

Coke or charcoal, when added to asbestic or serpentine filtering material, has the advantage, for the separation of oil, grease, and some other substances, that the coke or charcoal, being porous, is itself absorbent of oil, grease, and some other substances, to a considerable extent; so that in such cases the coke or charcoal has in itself an effective filtering action and acts as a filtering material in addition to acting to prevent undue compression of the fibrous material.

What I claim is:—

1. A filtering material comprising a mechanical mixture of combustible granular material and fibrous mineral material.

2. A filtering material consisting of approximately two parts of comminuted coke, and one part of asbestic fiber.

In testimony whereof I have signed this specification in the presence of two subscribing witnesses.

ARTHUR E. KRAUSE.

Witnesses:
 H. M. MARBLE,
 D. A. DAVIES.